(12) United States Patent
Haas et al.

(10) Patent No.: US 7,562,351 B2
(45) Date of Patent: Jul. 14, 2009

(54) POSTPROCESSING OFFICE METHOD AND SYSTEM

(75) Inventors: Rolf W. Haas, Schramberg (DE); Otfried Bruetzel, Hespe (DE)

(73) Assignee: SAP AG, Walldorf (DE)

( * ) Notice: Subject to any disclaimer, the term of this patent is extended or adjusted under 35 U.S.C. 154(b) by 593 days.

(21) Appl. No.: 10/747,304

(22) Filed: Dec. 30, 2003

(65) Prior Publication Data

US 2005/0144527 A1 Jun. 30, 2005

Related U.S. Application Data

(60) Provisional application No. 60/528,192, filed on Dec. 10, 2003.

(51) Int. Cl.
G06F 9/44 (2006.01)
G06F 9/46 (2006.01)
G06F 11/00 (2006.01)

(52) U.S. Cl. ............................ 717/127; 714/48; 714/57; 718/101

(58) Field of Classification Search .................. 717/124
See application file for complete search history.

(56) References Cited

U.S. PATENT DOCUMENTS 5,872,970 A * 2/1999 Pickett et al. ............... 718/101

| | | |
|---|---|---|
| 6,170,082 B1 * | 1/2001 | Demaray et al. ............. 717/127 |
| 6,430,562 B1 * | 8/2002 | Kardos et al. ................. 707/10 |
| 6,874,010 B1 * | 3/2005 | Sargent ....................... 709/203 |
| 2002/0116665 A1 * | 8/2002 | Pickover et al. ............... 714/38 |
| 2003/0061266 A1 * | 3/2003 | Ouchi ......................... 709/106 |
| 2004/0153823 A1 * | 8/2004 | Ansari ......................... 714/38 |

OTHER PUBLICATIONS

"Quality of Service in an Information Economy", Braumandlb et al., Nov. 2003, pp. 291-333. Online retrieved at <http://delivery.acm.org/10.1145/950000/945847/>.*

* cited by examiner

*Primary Examiner*—Tuan Q Dam
*Assistant Examiner*—Thuy Dao
(74) *Attorney, Agent, or Firm*—Kenyon & Kenyon LLP

(57) ABSTRACT

Methods and systems are provided for post-processing of errors from mass/batch processing of business processes. A method includes executing a business process; determining a failure occurred during the execution of the business process; obtaining information related to the failed business process; and creating a post-processing order using the information including the errors that occurred when the business process failed. The method also includes correcting the errors identified in the post-processing order and re-executing the failed business process. The method further includes determining whether re-executing the corrected business process was successful; and setting a status of the post-processing order related to the business process to indicate completion and setting a status related to correcting the error to indicate completion, if re-executing the failed business process was successful.

32 Claims, 11 Drawing Sheets

POSTPROCESSING OFFICE METHOD AND SYSTEM

CROSS REFERENCE TO RELATED APPLICATION

This application claims benefit of priority of U.S. Provisional Patent Application Ser. No. 60/528,192, filed Dec. 10, 2003.

FIELD OF THE INVENTION

The field of the invention relates to post-processing of errors and, in particular to methods of and apparatus' for providing post-processing of errors from mass/batch processing of business processes.

BACKGROUND

Normally other programs called "business process control programs" execute business processes and usually run without user interaction. Typically, a business process control program is responsible for the execution of one type of business process for many business objects. The business process control programs are often responsible for the execution of business processes without user interaction and frequently run without user oversight at night. Therefore, the possibility of immediate user interaction, if a problem occurs during processing, is generally very low. Unfortunately, some of the executed business processes fail and cannot be automatically re-executed by the business process control program, for a variety of different reasons. When a business process fails to execute properly, it generates one or more error messages to explain the failure.

Currently, if a business process control program starts executing a business process and the business process execution fails and terminates with an error, the business process control program writes the one or more error messages generated to explain the error(s) to an error log file. Later, for example, the next day, a user may look at the error(s) in the error log file and attempt to determine why the error(s) occurred and attempt to correct the error(s). Unfortunately, the error messages are written sequentially to the error log file as they are encountered during execution, regardless of from which business process they originated. Therefore, the error log file merely contains a list of error messages arranged in time sequence without any identification of which of the messages belongs to which of the failed business processes. It becomes particularly difficult to determine which errors belong to which failed business process when more than one business process is executing at a time and errors are concurrently occurring in more than one executing business process and being written to the error log file. Consequently, the errors for each failed business process in the error log file can either be in sequential order or separated by error messages from one or more failed business processes. Therefore, it would useful to minimize the difficulties associated with post-processing error correction for failed business processes.

DETAILED DESCRIPTION

Embodiments of the present invention provide improved methods and of and apparatuses for providing post-processing of errors from mass/batch processing of business processes. In accordance with embodiments of the present invention, if a business process control program starts a business process and the business process execution fails and terminates with an error, then the business process control program may write one or more error messages explaining the situation to an error log file and may create a "post-processing order" for the faulty business process. The "post-processing order" may contain all information related to the failed execution of the business process. For example, the post-processing order may include:

A business process type.

An Identification of the executing business process control program.

A business object (e.g., the business object that is most involved in the execution of the business process).

A master business object (e.g., another very important business object, to which the (normal) business object may belong).

A most important error that occurred while trying to execute the business process.

All other errors that occurred while trying to execute the business process.

A status of the problem solving, regardless of whether the problem solving is performed manually or automatically, for the post-processing order, for example, the status may include values to indicate "new", "in process" and/or "executed." In addition, the status of the problem solving may show whether there is still work necessary (that is, is it still necessary to solve problems that are the reason the business process could not be executed). The status also may be used to select post-processing orders, for example, in a manual embodiment, to perform the manual problem solving in the special dialog transaction.

A status of the business process belonging to the order may include, for example, "failed" and/or "executed." The status of the business process may show whether the business process still needs to be executed. Likewise, the status of the business process may be used by programs that automatically try to re-execute the failed business process. The re-execution may be attempted either before or after any problem solving may have occurred.

An ID of the error log file.

In accordance with embodiments of the present invention, a post-processing order may be created for every failed execution of a business process. Normally, the business process runs without user interaction, for example, at night in a batch job. In general, only one post-processing order is created for each failed execution of the business process, and the post-processing order may contain all information that is necessary to work with the post-processing order and determine the reason for the failure.

Figure 1:
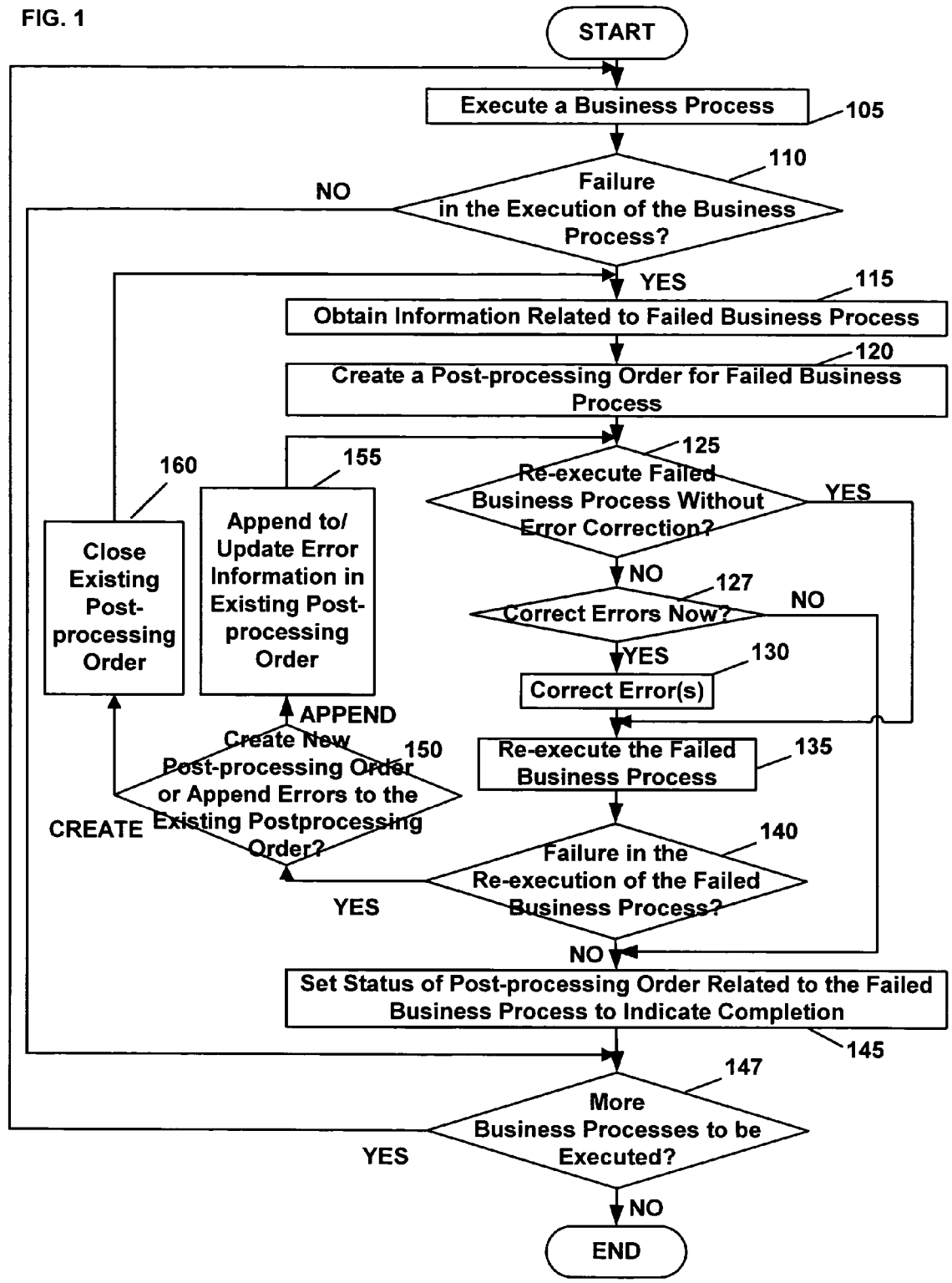
FIG. 1 is an overall flow diagram of a method for the execution of a business process, error detection, re-execution and error correction of the failed business process, in accordance with an embodiment of the present invention.

FIG. 1 is an overall flow diagram of a method for the execution of a business process, error detection, re-execution and error correction of the failed business process, in accordance with an embodiment of the present invention. In FIG. 1, a business process may be executed (105) by, for example, a business process control program, in the present embodiment. Specifically, the business process control program, for example, may execute (105) the business process in an off-line, that is, a batch processing, mode with little or no user supervision and/or interaction. However, the method also may work in a real-time and/or an on-line execution mode of the business process. The method may determine (110) whether the execution of the business process failed and, if it is determined (110) that the execution was successful, the method may terminate. However, if it is determined (110) that the execution failed, information related to the failed business process may be obtained (115). A post-processing order for the failed business process may be created (120) using, for example, the information, which may include one or more errors associated with the failed business process and related business object.

In FIG. 1, in accordance with the presently described embodiment, the method may determine (125) whether to try to re-execute the failed business process without first attempting to correct the error(s) responsible for the failed execution. This determination (125) may occur at various times after the execution of the business process is determined (110) to have failed. Therefore, it is possible that the business process will be re-executed before the information may be obtained (115) and/or the post-processing order may be created (120). In fact, in some embodiments of the present invention, first-time failures of a business process may be automatically scheduled to be re-executed without obtaining (115) the information or creating (120) the post-processing order. In these embodiments, obtaining (115) the information and creating (120) the post-processing order may be delayed until a subsequent re-execution of the failed business process occurs. In other embodiments of the present invention, the determination (125) of whether to try to re-execute the failed business process without error correction may be delayed for a specified amount of time or a specified event related to the execution of the business process itself or a group of other business processes that may be being executed concurrently with the failed business process. Regardless of when determined (125), if it is determined (125) to try to re-execute the failed business process without performing error correction, the method may re-execute (135) the failed business process again and the method may continue to determine (140) whether the re-execution of the business process failed, as described in the subsequent paragraphs.

In FIG. 1, in accordance with the presently described embodiment, if it is determined (125) not to re-execute the failed business process without error correction, the method may determine (127) whether the errors can be corrected immediately and if so, the error(s) identified in the post-processing order for the failed business process may be corrected (130). The error correction, generally, is performed on the processing environment and not on the failed business process, and may be performed automatically, manually with user interaction or both. In general, the post-processing order may be used to identify and correct the error(s), which is/are the cause of the failure, and it may be more efficient for the correction to be performed automatically, since the error correction may be performed immediately after the determination (110) that the business process failed to execute properly and the post-processing order is created (120). This automatic error correction has the advantage of not being dependent on a user starting or manually performing the error correction. Once the error correction has been completed, generally, in the environment in which the business process was attempted to be executed, the business process may be re-executed (135) and whether the re-execution of the business process failed may be determined (140). If the re-execution of the business process was determined (140) to be successful, a status of the post-processing order for the business process may be set (145) to indicate that the execution of the business process is now complete. If it is determined (127) that the error can not be corrected at this time, the method may determine (147) whether there are more business processes to be executed and, if there are more business processes to be executed, the method may loop back to execute (105) the next business process and the method may continue as described above. If it is determined (147) that there are no more business processes to be executed, the method may terminate.

In FIG. 1, in accordance with the presently described embodiment, if it is determined (140) that the re-execution of the business process failed, a determination (150) of whether to create a new post-processing order or to append the new errors to the post-processing order that already exists for the failed business process may be made. If it is determined (150) to append the new error(s) to the post-processing order, the new error information may be appended (155) to the post-processing order and the method may continue by trying to determine (125) whether to re-execute the failed business process without error correction. Similarly, if it is determined (150) to create a new post-processing order, the post-processing order may be closed (160), the method may continue by obtaining (115) new information related to the failed re-execution of the failed business process and a new post-processing order may be created (120) for the failed re-execution of the failed business process. In accordance with an embodiment of the present invention, the creation (120) of the new post-processing order may include setting a link in the new post-processing order to the related, now closed post-processing order.

Although FIG. 1, as well as other method figures in this application, may seem to indicate an implicit ordering for the method, none should be assumed, as the actual ordering may vary depending on the embodiment.

Figure 2:
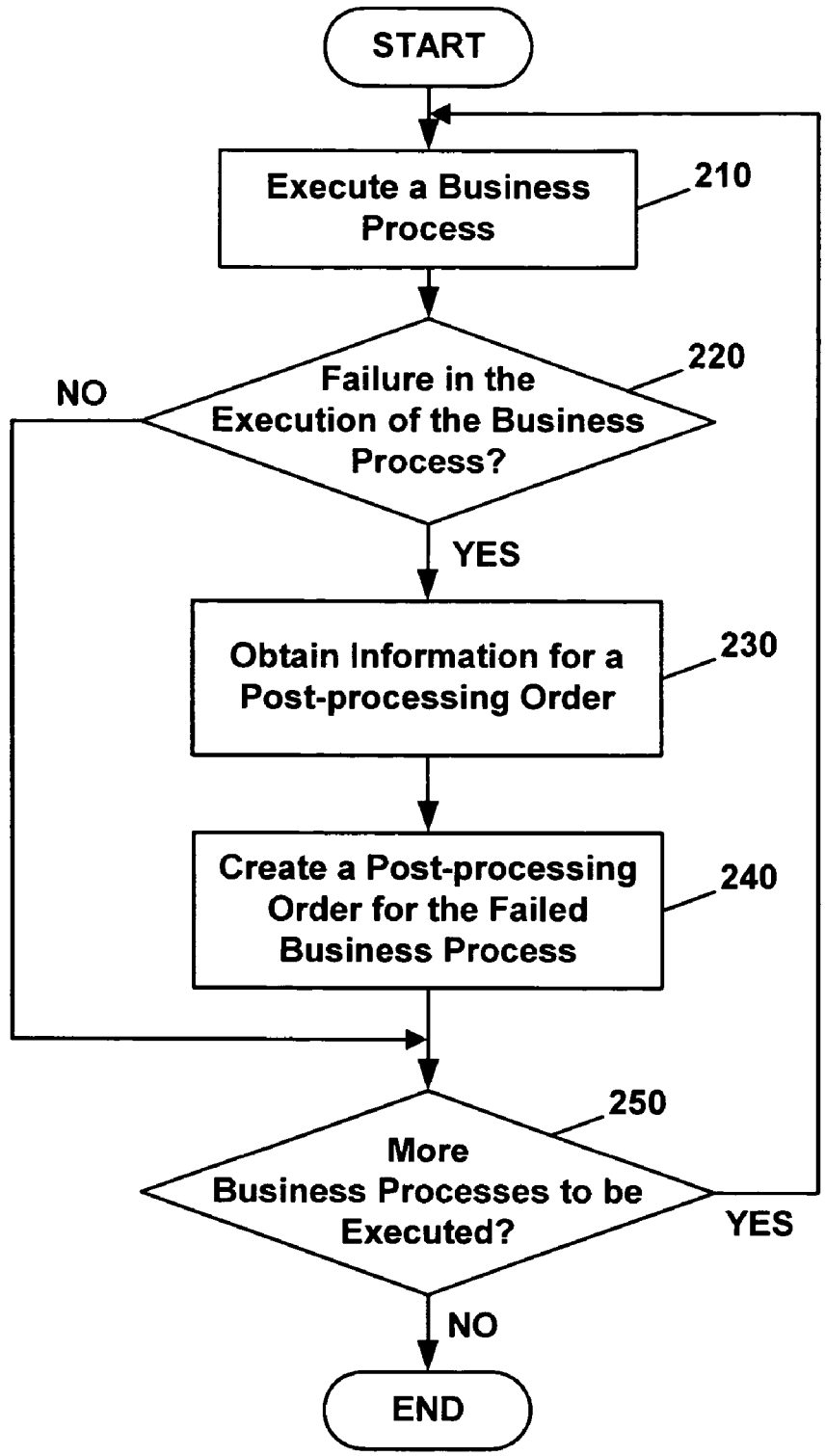
FIG. 2 is a flow diagram of a portion of the method of FIG. 1 for executing the business process and detecting errors during the execution, in accordance with an embodiment of the present invention.

FIG. 2 is a flow diagram of a portion of the method of FIG. 1 for executing the business process and detecting errors during the execution, in accordance with an embodiment of the present invention. In FIG. 2, a business process may be executed (210) by, for example, a business process control program, in the present embodiment. The business process control program may execute (210) the business process in an off-line, that is, a batch processing, mode with little or no user supervision and/or interaction. The business process control program also may execute (210) the business process in an on-line mode, that is, with active user supervision an/or information. The method may determine (220) whether the execution of the business process failed and, if it is determined (220) that the execution failed, information related to the failed business process may be obtained (230). A post-processing order for the failed business process may be created (240) using, for example, the obtained (230) information including one or more errors associated with the failed business process. The method may determine (250) whether there are more business processes to be executed by the business process control program. If it is determined (250) that there are more business processes to be executed, the method may loop back to execute (210) a next business process and continue from this point as described above. If it is determined (250) that there are no more business processes to be executed, the method may terminate.

Figure 3:
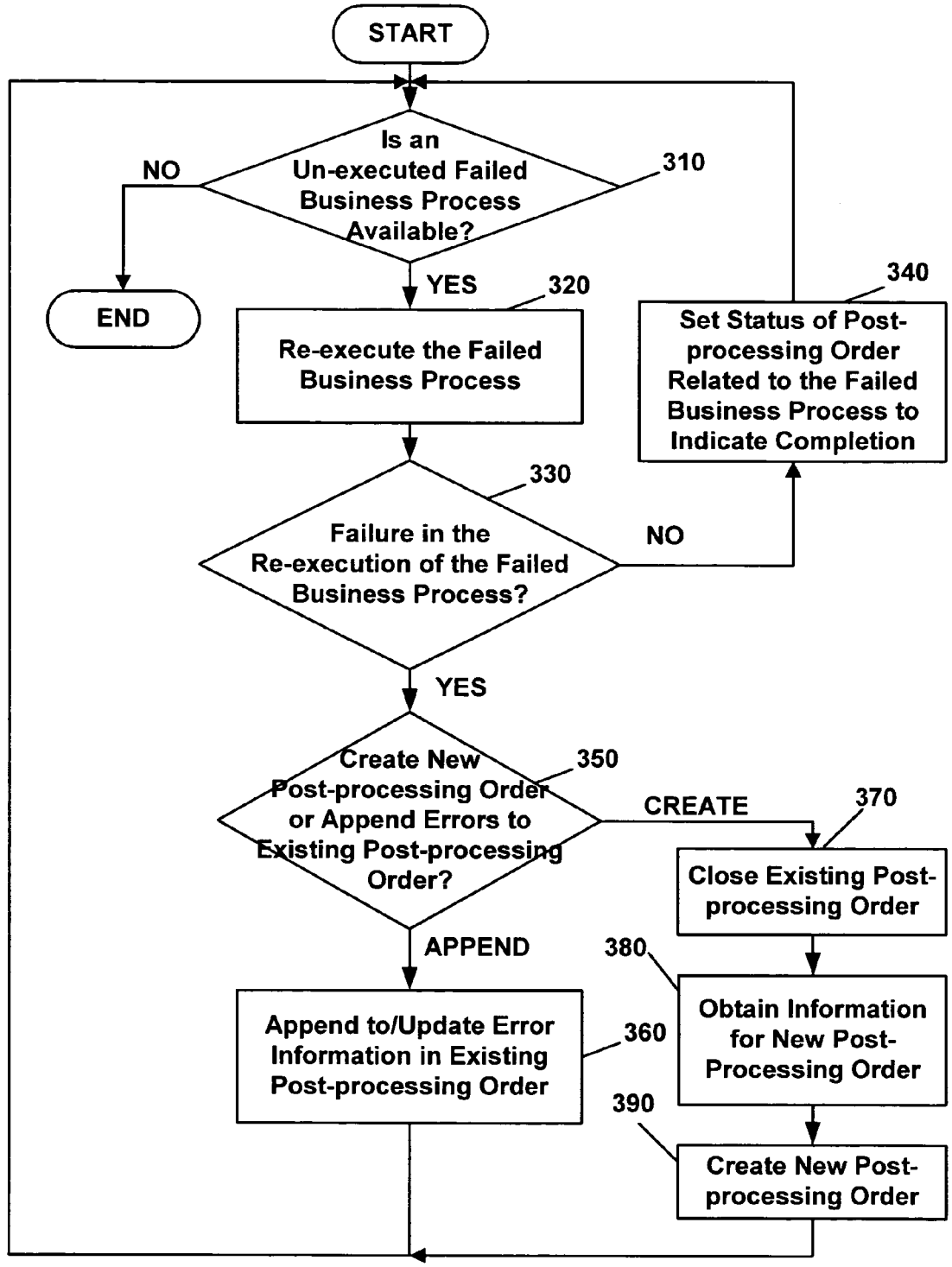
FIG. 3 is a flow diagram of another portion of the method of FIG. 1 for re-executing the business process, if it failed, in accordance with an embodiment of the present invention.

FIG. 3 is a flow diagram of another portion of the method of FIG. 1 for re-executing the business process, if it failed, in accordance with an embodiment of the present invention. In FIG. 3, whether an un-executed failed business process is available may be determined (310) and, if none are available, the method may terminate. However, if an un-executed failed business process is available, the failed business process may be re-executed (320) and whether a failure occurred during the re-execution of the failed business process may be determined (330). If it is determined (330) that the re-execution was successful, a status of a post-processing order related to the failed business process may be set (340) to indicate the business process is complete, if a post-processing order was created for the failed business process. The method may loop back to determine (310) whether another unexecuted failed business process is available and continue from this point as described above.

In FIG. 3, if it is determined (330) that the re-execution failed, a determination (350) of whether to create a new post-processing order or to append the new errors to the post-processing order for the failed business process may be made. If it is determined (350) to append the new error(s) to the post-processing order, the new error information may be appended (360) to the post-processing order and the method may continue by trying to determine (310) whether another un-executed failed business process is available and continue from this point as described above. Similarly, in FIG. 3, if it is determined (350) to create a new post-processing order, the post-processing order may be closed (370), if existing, the method may continue by obtaining (380) information related to the failed re-execution (320) of the failed business process and a post-processing order may be created (390) for the failed re-execution of the failed business process. In accordance with an embodiment of the present invention, the creation (390) of the new post-processing order may include setting a link in the new post-processing order to the related, now closed post-processing order. The method may continue by looping back to determine (310) whether an un-executed failed business process is available and continue from this point as described above.

Figure 4:
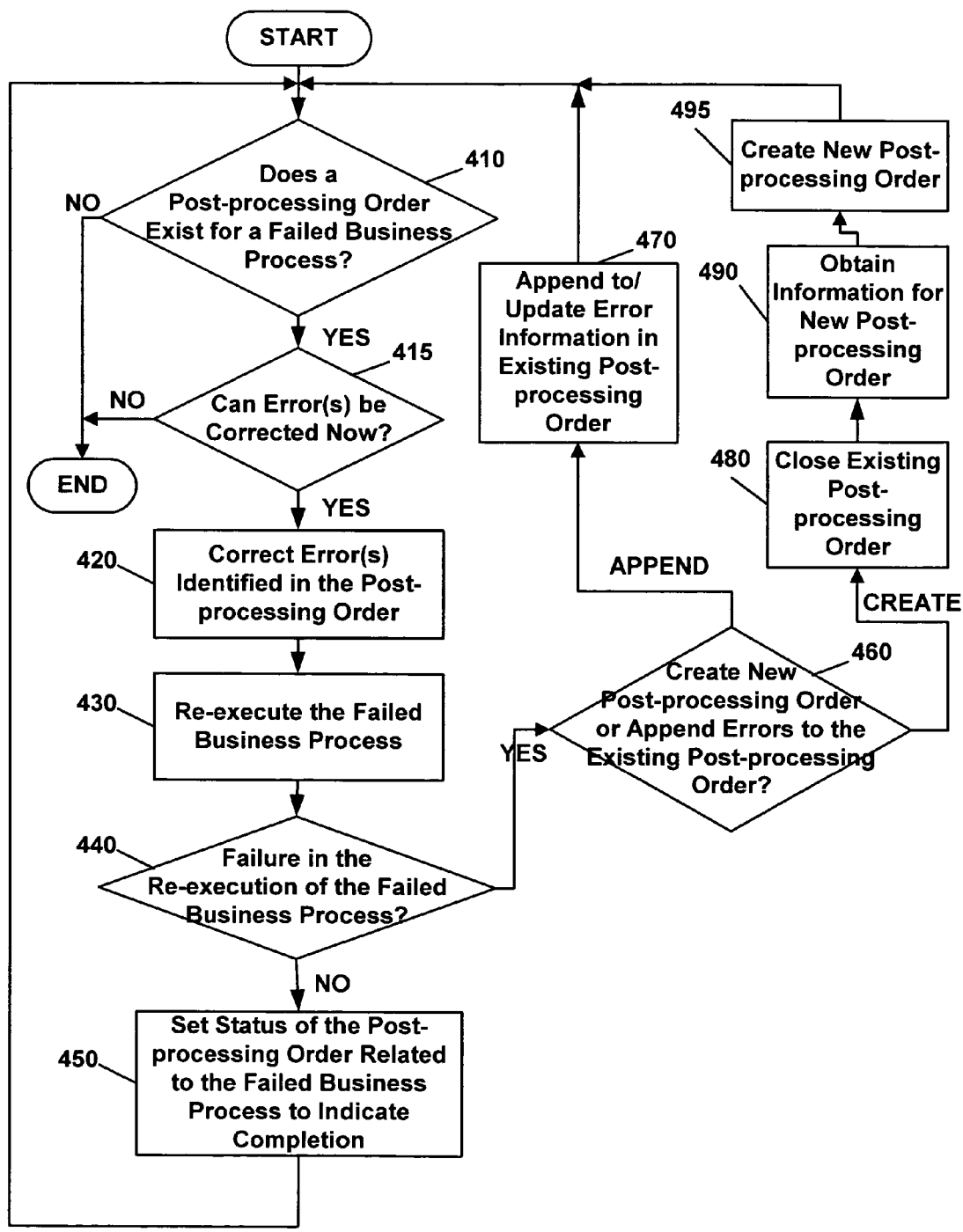
FIG. 4 is a flow diagram of another portion of the method of FIG. 1 for correcting errors detected in the failed business process, in accordance with an embodiment of the present invention.

FIG. 4 is a flow diagram of yet another portion of the method of FIG. 1 for correcting errors detected in the failed business process, in accordance with an embodiment of the present invention. In FIG. 4, whether a post-processing order exists for a failed business process may be determined (410) and, if no post-processing orders exist, the method may terminate. However, if it is determined (410) that a post-processing order does exist, whether error correction can be performed at this time may be determined (415) and if it may be performed, one or more of the error(s) identified in the post-processing order may be corrected (420). If it is determined (415) that the error correction can not be performed at this time, the method may terminate. As previously described, in some embodiments of the present invention, the error correction may occur automatically, while in other embodiments, the error correction may be performed manually by a user, and in still other embodiments, the error correction may be performed using a combination of automatic and manual processing. In FIG. 4, the failed business process may be re-executed (430) and whether the re-execution (430) of the failed business process failed may be determined (440). If the re-execution (430) of the failed business process is determined (440) to be successful, the status of the post-processing order may be set (450) to indicate the execution of the business process is complete and the method may loop back to determine (410) whether a post-processing order exists for another failed business process and continue from this point as described above.

In FIG. 4, in accordance with the present embodiment, If the execution (430) of the failed business process is determined (440) to be a failure, a determination (460) of whether to create a new post-processing order or to append the new errors to the existing post-processing order for the failed business process may be made. If it is determined (460) to append the new error(s) to the existing post-processing order, the new error information may be appended (470) to the existing post-processing order and the method may continue by trying to determine (410) whether a post-processing order exists for another failed business process and continue from this point as described above. Similarly, if it is determined (460) to create a new post-processing order, the existing post-processing order may be closed (480), if one exists, the method may obtain (490) information related to the failed execution (430) of the re-executed business process and a new post-processing order may be created (495) for the failed re-executed business process. In accordance with an embodiment of the present invention, the creation (495) of the new post-processing order may include setting a link in the new post-processing order to the related, but now closed, post-processing order. Consequently, a business process that has more than one failed execution may be linked to more than one other closed post-processing order. The method may continue by looping back to determine (410) whether a post-processing order exists for another failed business process and continue from this point as described above.

Figure 5:
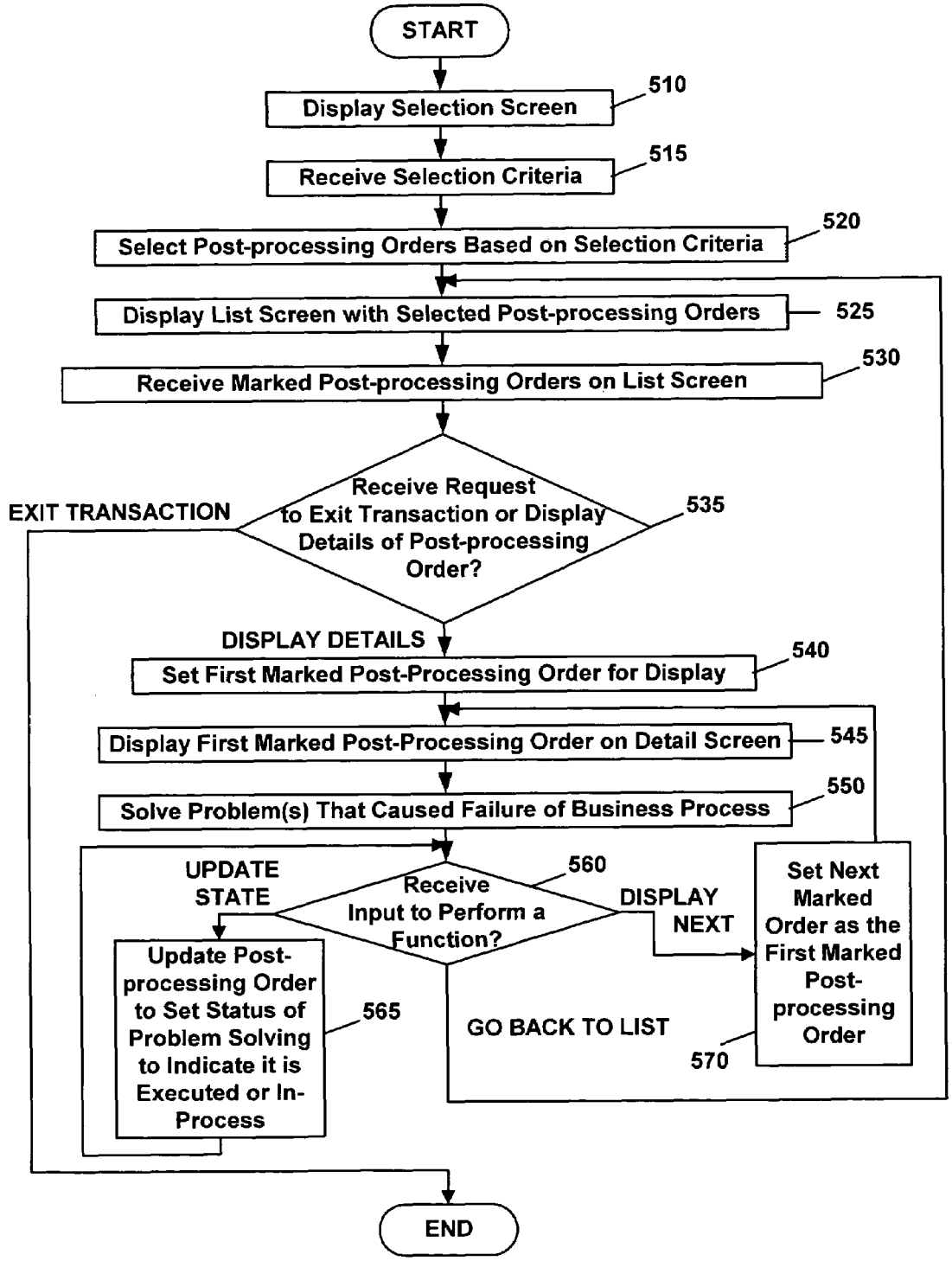
FIG. 5 is a process flow diagram of a method of manual processing of post-processing orders created during execution of business processes, in accordance with an embodiment of the present invention.

FIG. 5 is a process flow diagram of a method of manual-automatic processing of post-processing orders created during execution of business processes, in accordance with an embodiment of the present invention. In FIG. 5, in accordance with this embodiment of the present invention, in response to a user request to begin a transaction a screen may be displayed (510), for example, a selection screen may be displayed (510). The selection screen may be used by the user to input specific selection criteria to obtain a list of available postprocessing orders. In general, the selection criteria may be used to limit the number of post-processing orders that are retrieved and to select those post-processing orders that are of interest to the user, for example, only those orders for which the user is responsible. The selection criteria may be received (515) and the method may select (520) one or more post-processing orders based on the received selection criteria. The selected one or more post-processing orders may be displayed (525) in a screen, for example, a post-processing order list screen, for the user to review and mark which of the displayed (525) one or more post-processing orders to review in more detail. The method may display (530) the one or more marked post-processing orders from the one or more post-processing orders in, for example, a list screen.

In FIG. 5, in accordance with the present embodiment, the method may determine (535) whether a request to exit the transaction or a request to display the details of the marked post-processing orders was received. If it is determined (535) that the request to exit the transaction was received, the method may terminate. If it is determined (535) that the request to display the details of the marked post-processing orders was received, the first marked post-processing order may be set (540) to be displayed. The method may display (545) the first marked post-processing order on a detail screen for the user to review, analyze and solve (550) the problem(s), that is, correct the error(s), that caused the business process associated with the post-processing order to fail. The user may use the detail screen to review the post-processing error and to correct the reason(s) the execution of the business process failed.

In FIG. 5, the method may determine (560) which function related to the post-processing order that is requested to be performed based on a user input. If the user input is determined (560) to request to update the status of the problem solving, the post-processing order may be updated (565) to set the status of the problem solving to indicate whether the problem solving has been performed, for example, update (565) the status to indicate that it has been executed or is in-process. The method may continue by looping back to determine (560) which function input was received and continue from this point as described above. If the user input is determined (560) to request to go back to the list, the method may loop back and display (525) the selected post-processing orders on the list screen and continue from this point as described above. If the user input is determined (560) to request to display the next marked post-processing order on the list, the method may loop back and display (545) the next marked post-processing order on the detail screen and continue from this point as described above.

Figure 6:
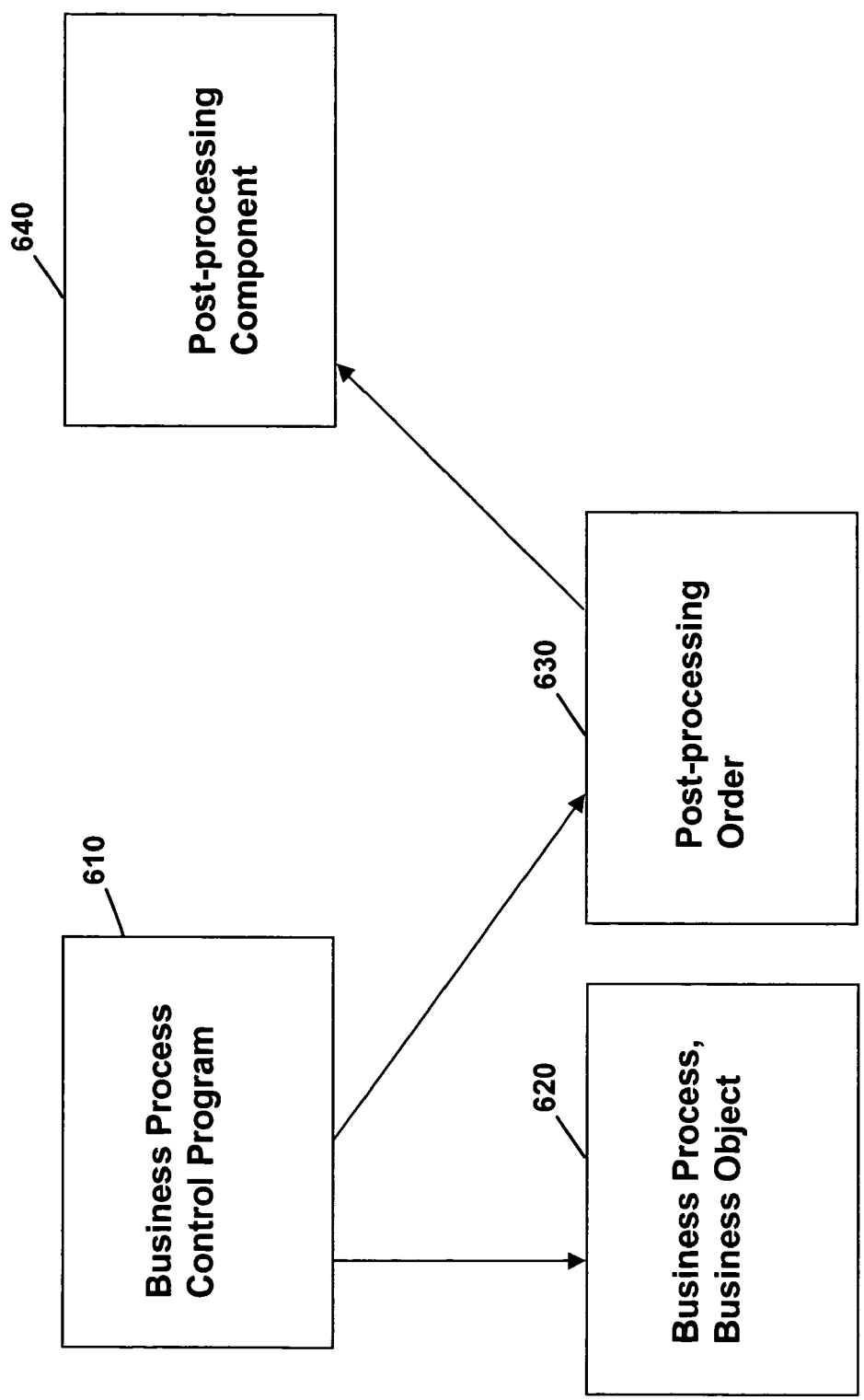
FIG. 6 is a block diagram of a business process processing and post-processing order creation system, in accordance with an embodiment of the present invention.

FIG. 6 is a block diagram of a business process processing and post-processing order creation system, in accordance with an embodiment of the present invention. In FIG. 6, a business process control program 610 may control the execution of a business process 620, which may be related to a specific business object. Business process control program 610 also may create a post-processing order 630 for each business process 620 when the execution of business process 620 fails. A post-processing component 640, for example, a post-processing system, may receive post-processing order 630 for the failed business process and attempt to re-execute business process 620, either in its original status or after performing error correction processing on business process 620 using post-processing order 630. Post-processing component 640 may use post processing order 630 and include a dialog transaction for working with the orders and a service report. In accordance with an embodiment of the present invention, the operation of the post-processing component may be summarized to include:

If the execution of a business process, which, generally, runs without user interaction, fails, a post-processing order may be created.

Subsequently, the post-processing order may be automatically and/or manually processed, for example, using a special dialog transaction, to correct one or more error(s) that caused the failure.

Figure 7:
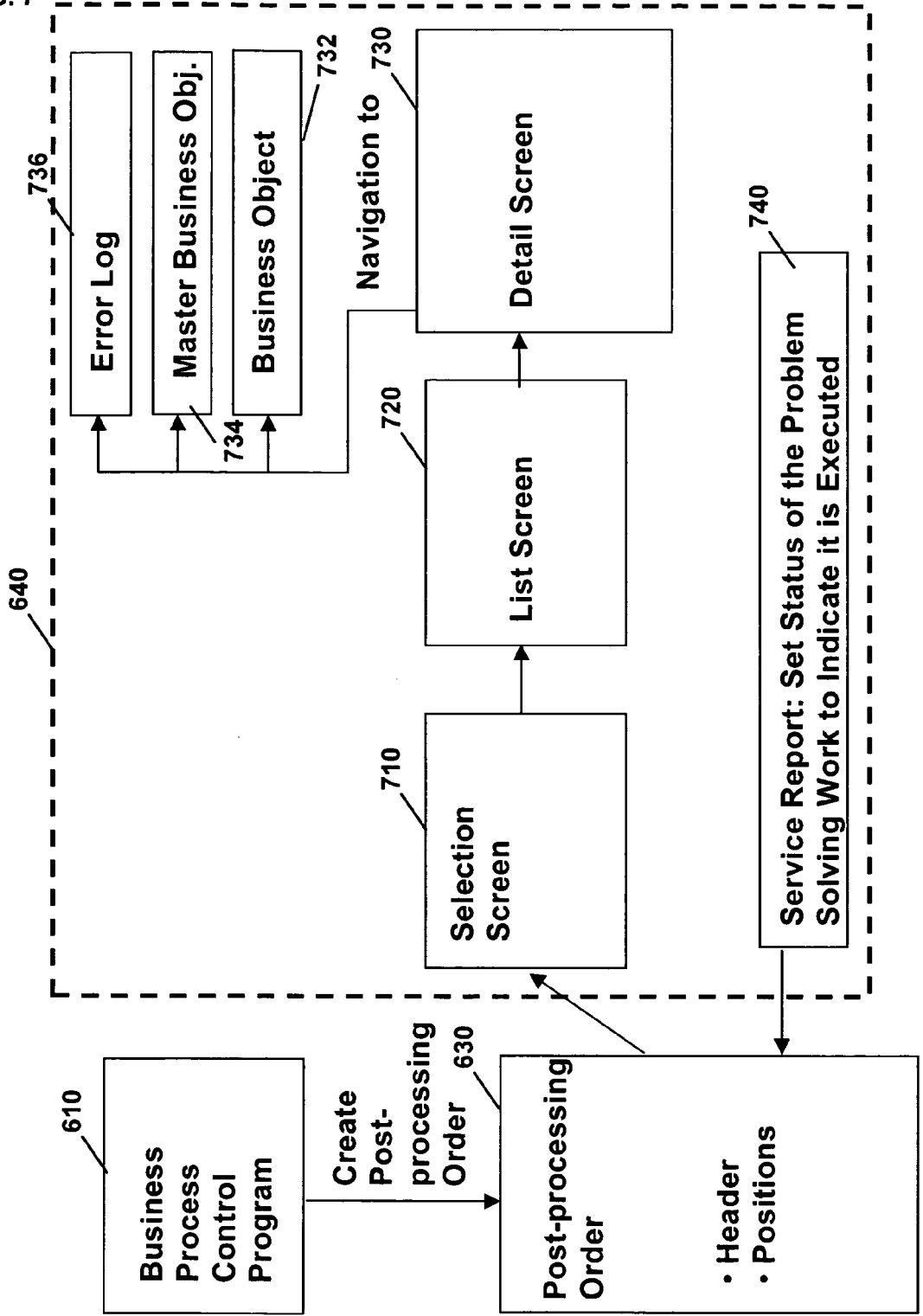
FIG. 7 is a detailed block diagram of the business process processing and post-processing order creation system of FIG. 6, in accordance with an embodiment of the present invention.

FIG. 7 is a detailed block diagram of the business process processing and post-processing order creation system of FIG. 6, in accordance with an embodiment of the present invention. In FIG. 7, the process of creating and using post-processing order 630 is shown in relation to the system of FIG. 6. In FIG. 7, business process control program 610 may create post-processing order 630, if an executing business process (not shown) experiences a failure that prevents the business process from completing its execution. In FIG. 7, post-processing order 630 may include a header and zero, one or more positions that uniquely identify each post-processing order with a failed business process. Post-processing component 640 may provide a selection screen 710 on which a user may enter selection criteria to retrieve one or more specific post-processing orders of interest to the user. The selection criteria may include, but is not limited to, for example, a specific business process, a specific post-processing order, a type of business process, a responsible party (for example, the user), etc. A list of post-processing orders may be displayed on a list screen 720 in response to the selection criteria entered in selection screen 710. In general, the header information for the post-processing order may be displayed, including, for example, the status of the post-processing order, the business object related to the business process, a master business object related to the business object, a most important error message, one or more customer fields and administrative data. The user may navigate to each of the business objects contained in list screen 720 by selecting the desired object.

In FIG. 7, selecting a specific post-processing order from list screen 720 may cause a detail screen 730 to be displayed that contains all header and position information related to that post-processing order. As in list screen 720, the user may navigate to each of the objects contained in detail screen 730 for review and correction, if necessary. For example, the user may navigate to business object 732, which is related to the failed business process, a master business object 734 and an error log 736. Master business object 734, generally, is related to and controls business object 732 and error log 736 contains all error messages in post-processing order 630. Post-processing component 640 may also include at least one service report to set a status of the problem work to indicate that it has been executed after the error(s) have been corrected. The at least one service report, for example, may set all post-processing orders belonging to one business process for one day (date, time of execution) to indicate that the problem solving work has been executed. The report may be used if a global problem exists and it makes no sense to look at all of the created post-processing orders. After solving the problem (i.e., the reason why the execution of all business processes failed), the business processes may be executed again by starting the corresponding business process control program(s).

Figure 8:
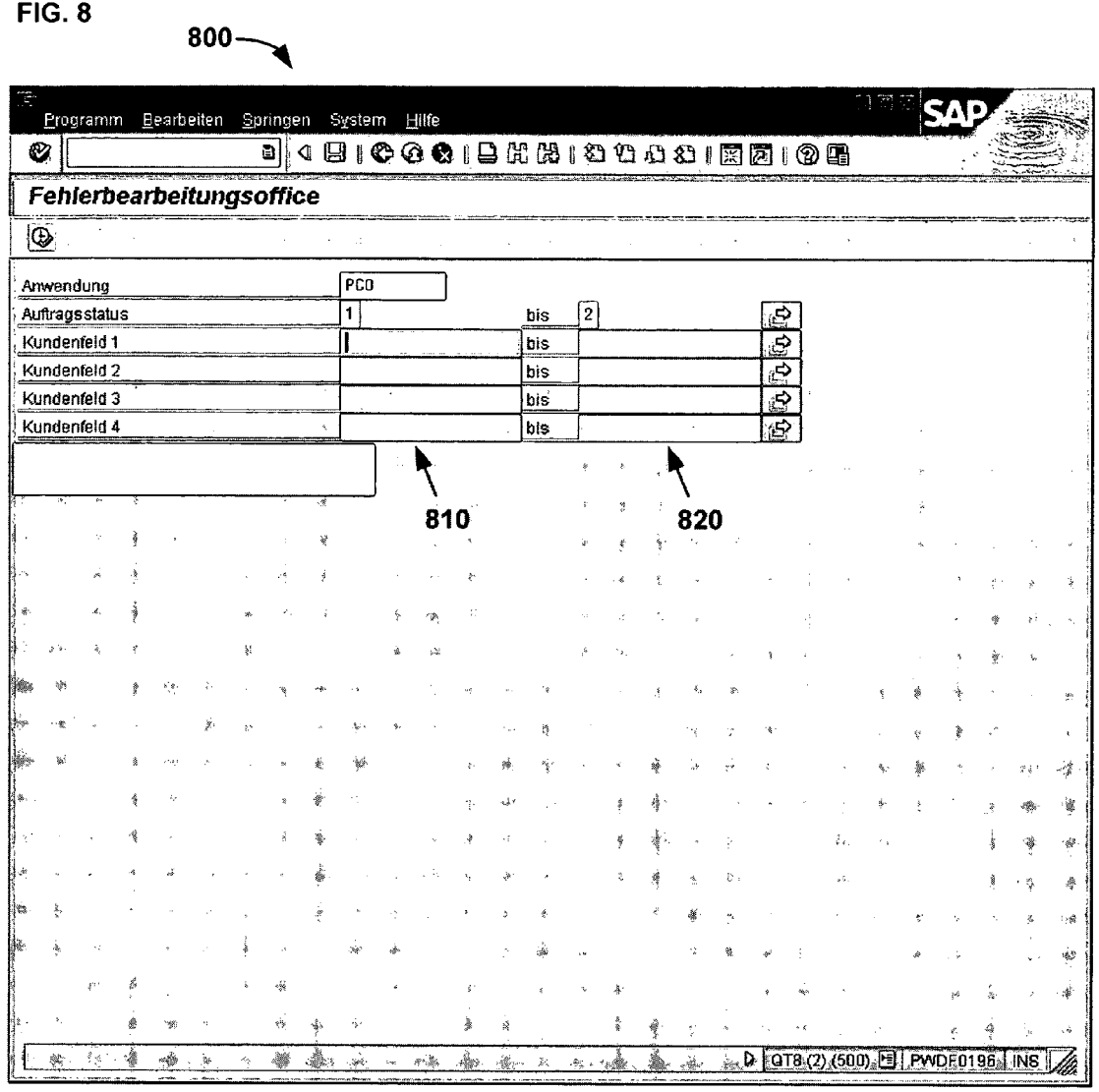
FIG. 8 is a screen shot of a selection screen for the entry of post-processing order selection criteria, in accordance with an embodiment of the present invention.

FIG. 8 is a screen shot of a selection screen 800 for the entry of post-processing order selection criteria, in accordance with an embodiment of the present invention. In FIG. 8, a plurality of first criteria entry fields 810 and a plurality of second criteria, entry fields 820 are provided for the entry of single criteria and/or multiple criteria combinations. Selection screen 800 merely represents one embodiment and numerous other embodiments are envisioned in which more than the displayed plurality of first and second criteria, entry fields as well as additional criteria, entry fields (for example, third and above criteria, entry fields) may be provided.

Figure 9:
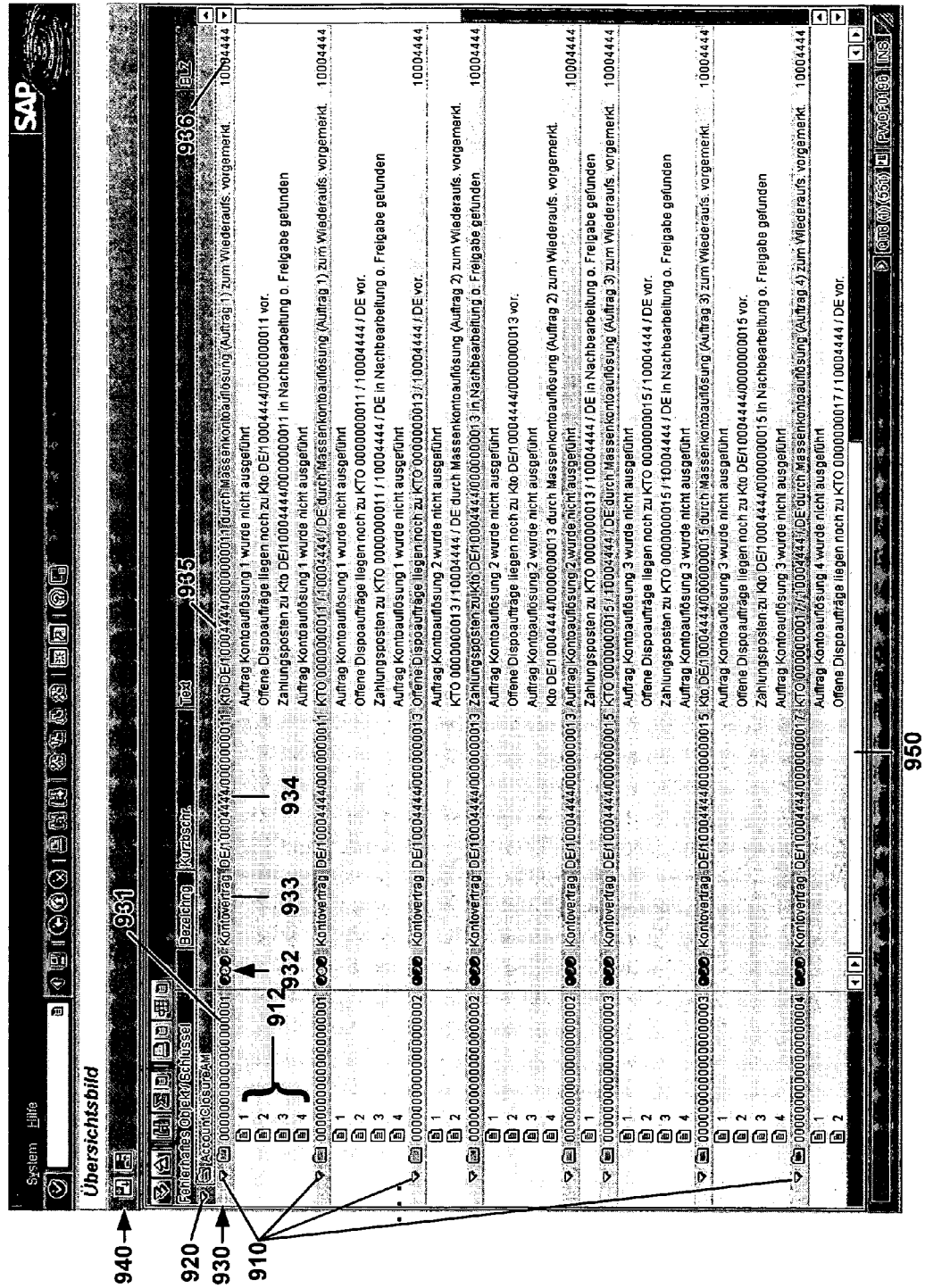
FIG. 9 is a screen shot of a list screen for the display of the post-processing orders identified by the selection criteria entered in the selection screen of FIG. 6, in accordance with an embodiment of the present invention.

FIG. 9 is a screen shot of a list screen 900 for the display of the post-processing orders identified by the selection criteria entered in selection screen 800 of FIG. 8, in accordance with an embodiment of the present invention. List screen 900 may include header information associated with one or more post-processing orders identified by the selection criteria entered in selection screen 800 of FIG. 8. In FIG. 9, list screen 900 may display various objects, for example, a business object, a master business object, a most important error message, one or more customer specific fields, administrative data and, optionally, all other errors associated with the post-processing order. A user may navigate to, that is, access, and work with the objects on list screen 900 by selecting an object. The selection may be made by, for example, clicking and/or double-clicking on the object with a computer mouse. Selecting a post processing order from list screen 900 may result in a detail screen being displayed in which all information, that is, the header and position information, related to the post-processing order being displayed.

In FIG. 9, in accordance with the present embodiment, the amount of information displayed for each post-processing order may be controlled by selecting a display/hide icon 910, which may either display all other error messages 912 associated with a post-processing order 930, if they are not currently displayed, or hide all other error messages 912, if they are currently displayed. For example, selecting any one of display/hide 910 icons in FIG. 9 may result in other error messages 912 for that post-processing order being hidden, that is, removed from being displayed on list screen 900. Consequently, only post-processing order level information may be displayed in list screen 900. A business process type 920 associated with each of the subsequently listed post-processing orders, for example post-processing order 930, may be displayed. A function bar 940 may include 2 function elements that may be used to display and/or hide other error messages 912 for all displayed post-processing orders.

In FIG. 9, in accordance with the present embodiment, a post-processing order 930 may include an identification of the post-processing order field 931; a status field 932 with, for example, selectable red, yellow and green status identifiers; a business object type field 933; a business object name key field 934; a most important error message field 935; and zero, one or more customer-specified field(s) 936. Status field 932 may be changed by clicking on the desired status identifier. In status field 932, red signifies a new post-processing order for which no error correction has been performed, yellow signifies the post-processing order error correction is in-process, and green signifies the post-processing order error correction is complete. Object type field 933 provides information on a type of most important business object with which the business object is associated. Business object name key field 934 provides the name, for example, an external representation of the identification, of the most important business object with which the business object is associated. Most important error field 935 provides the most important error associated with post-processing order 930. Each of at least one customer-specified field(s) 936 may provide customer specific information that has been associated with post-processing order 930. Further fields, for example, a master business object field, may be viewed by moving a scroll bar 950 to the right on list screen 900.

Figure 10:
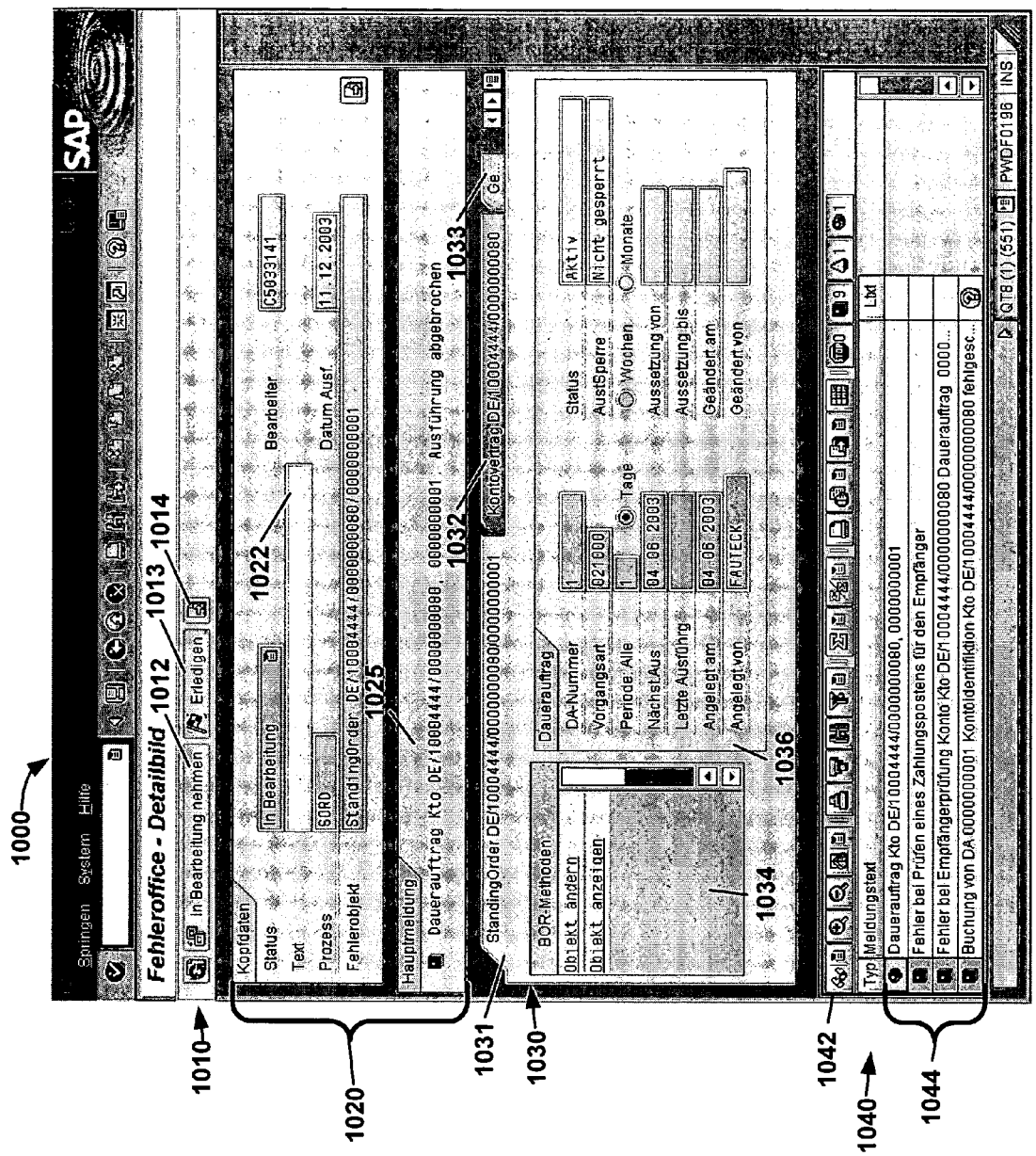
FIG. 10 is a screen shot of a detail screen for the display of and work with a selected post-processing order, in accordance with an embodiment of the present invention.

FIG. 10 is a screen shot of a detail screen 1000 for the display of and work with a selected post-processing order, in accordance with an embodiment of the present invention. In FIG. 10, detail screen 1000 may include a function bar 1010, a first section 1020 to display the post-processing order information including the most important error message, a second section 1030 to display the business object information associated with the post-processing order and a third section 1040 to display all other error messages associated with the post-processing order.

In FIG. 10, in accordance with the present embodiment, function bar 1010 may include a first function element 1012 that may be used to set the current status of the problem solving related to the post-processing order to "in process". Function bar 1010 also may include a second function element 1013 that may be used to set the status of the problem solving (that is, error correction) to "completed". Function bar 1010 may further include a next post-processing order icon 1014 that when selected may display the next post-processing order on detail screen 1000. First section 1020 may provide all information associated with the header of the displayed post-processing order and may include a note field 1022, which may be used to input a user note, and a most important error subsection 1025. Second section 1030 may include one or more tab-strip pages 1031, 1032, 1033 for each object in the post-processing order. Tab-strip 1031 may include a first subsection 1034 in which a list of function(s) associated with the object may be provided. Each function in the list may be accessed by selecting the function in first subsection 1034 and changes to the object may be made, if desired. A second subsection 1036 may provide detailed information about the object. Each of the one or more tab strips 1031,1032, 1033 may include the first and second subsections. Third section 1040 may include 1042 a toolbar including multiple, selectable command icons for working with a list of error messages 1044. List of error messages 1044 may contain all error messages associated with the post-processing order except the most important error, which may be displayed in most important error subsection 1025.

In accordance with embodiments of the present invention, a user, or an automated system/program, may work with the post-processing orders to solve the errors that are responsible for the business processes not being executed. For example, in an embodiment with manual user interaction, the work may be done using a special dialog transaction in which all of the errors that occurred while the execution of the business process failed may be displayed. In general, the special dialog transaction may be implemented in a specialized screen dialog screen, for example, detail screen 1000 of FIG. 10. In this way, it is very easy for the user to find out why the failure occurred. In fact, the user may solve the problem that caused the failure and re-start the execution of the failed business process. Likewise, in an automated system, although not necessary, the special dialog transactions may still be displayed for observation by users, analysts and/or operators responsible for the correct execution of the business processes.

In accordance with an embodiment of the present invention, the dialog transaction (for example, list screen 900 and/or detail screen 1000 of FIG. 10) for manually working with the post-processing order may:

Use locks to avoid two users trying to solve the same problem at the same time;

Be used to set a status of the problem solving in the post-processing order, for example, "new", "in processing" and/or "executed;"

Be used to set a status of the business process in the post-processing order, for example, "failed", "executed;"

Provide an overview list, which shows all post-processing orders that still need problem solving processing, be used to set a filter to the list of post-processing orders to get a smaller list containing only those post-processing orders which fulfill certain criteria; and Provide a detail screen, which shows all information that is relevant for one post-processing order, that may include, for example:

All error messages that occurred during execution of the business process;

Information about the business object that is most involved in the execution of the business process;

Information about other business objects that are also important in this context;

Links to the displaying screens for the other business objects;

Functionality to jump from the detail screen for the current post-processing order to other transactions for the business objects, for example to a "change" transaction;

Functionality to try a re-execution of the failed business process; and

Further information that depends on the business process and the errors that occurred during execution of the business. For example, intelligent controlling of the screen, since the information necessary to solve the problem generally depends on the business process and the errors that occurred, and the information is displayed as soon as the detail screen is displayed. The actual mapping of the business process and its associated errors to the displayed information may be done while customizing the post-processing order structure.

In accordance with an embodiment of the present invention, all information belonging to one failed execution of a business process, for example, all error messages, the business process, the business object, etc., may be put together in one post-processing order. This is in contrast to the old sequentially ordered error log that contained many error messages without any cross-references between related error messages. Unfortunately, it was not known which of the messages in the old error log belonged to the one failed execution of the business process. Also, other important information of the context of the failed execution of a business process, for example, an identification ("ID") of the business object and IDs of other important business objects, also may be stored in the post-processing order so they are later available when the post-processing order is processed for problem solving. The post-processing order may be created immediately after the failure of the business process. This has the advantage that at that time all the information about the failure is still available and can be stored in the post-processing order to be used in the problem solving of the failures at a later time. It may also be possible to store some other important information of the context of the failed business process in the post-processing order. For example, this information may include customer specific fields, which may later be used to determine who/what will be responsible for the problem solving of post-processing order and for setting the priority of the post-processing orders, that is, which of the post-processing orders must be processed first. Specifically, if the problem solving is manual, which has to do the manual problem solving work may be specified, and if the problem solving is automatic, what program/system has to do the problem solving work may be specified. In manual problem solving, a user may visually review the post-processing order, identify and correct the error(s) using, for example, the dialog transaction. In an automatic system, a computer program may be executed to review the post-processing order, identify and correct the error(s). The business process control program may also decide whether a post-processing order is to be created for a failed business process or not. For example, if the business process control program automatically tries, either in the same program run or at a later time, a re-execution of the failed business process, then it may not be necessary to create a post-processing order after the first failure, since it will be re-executed at a later time and the error(s) encountered in the first attempt may not be encountered in the second execution attempt.

Because of this structuring of error information in post-processing orders it may also be possible to set filters when using the display transaction to work with the post-processing orders, to obtain a special view of the post-processing orders. In accordance with an embodiment of the present invention, in combination with the "status" field in the post-processing order it is possible to get a list of all failed executions of business processes that still have to be processed manually.

The problem solving processing of the post-processing orders may be done very fast, so that the time to manually process one failed execution of a business process may be reduced significantly. The reasons for this speed may include:

Obtaining a list of post-processing orders containing only those post-processing orders, which have not been manually processed.

Using filters to make a special view on this list to get only those post-processing orders, which fulfill certain criteria.

A detail screen for the processing of a post-processing order may show all relevant information belonging to the associated problem—all relevant information may be available on one screen. This information may be dependent on the error and on the business process. Furthermore, it may be possible to jump directly in the display and change transaction of the involved business objects.

It may also be possible to re-execute a failed business process from this dialog transaction for the manual processing. Therefore, it may be possible to perform all of the tasks that must be performed from one place, that is, this dialog transaction for the manual work. Specifically, this may include first looking at the errors that occurred during the failed execution of the business process, solving the problems that were responsible for the failure, and re-executing of the business process.

In accordance with an embodiment of the present invention, when starting the dialog transaction for manual processing, a selection screen, for example, similar to that shown in FIG. 8, may be displayed for a user to specify which of the post-processing orders are to be displayed on the next screen. All attributes of the "header of the post-processing order" may be used for this selection. Typically, only post-processing orders that have the "status of the problem solving work" set to "not executed" may be selected. In other words, only the post-processing orders that still require problem-solving work to be performed may be selected. Other very important selection criteria may include the "business process" and the "customer fields."

In accordance with the present embodiment, after leaving the selection screen, a list of post-processing orders may be displayed in a list screen, for example, similar to that shown in FIG. 9. The list may contain one line for every post-processing order fulfilling the selection criteria entered in the selection screen. Optionally it is also possible to display all messages (e.g., positions of a post-processing order) in this list. In this case, there may be more than one row for one post-processing order in the list. The list may show all fields of the "header of the post-processing order" and, if all messages should be displayed, all fields of the "positions of the post-processing order" may be shown.

In accordance with the present embodiment, after selection of one post-processing order, a detail screen for the post-processing order may be displayed, for example, a detail screen similar to that shown in FIG. 10. From the detail screen it is possible to navigate back to the list screen using the "back" function or to navigate to the next post-processing order, if there are several post-processing orders selected on the list using a "get next" function. The detail screen is the "big picture" for one failed execution of a business process. All information stored in the post-processing order may be displayed. Furthermore, it is possible to display information that depends on the business process and on the most important error that was responsible for the failure of the execution of the business process. The mapping of the "business process" and "error" to the "relevant information in this error situation" may be done within a customizing table.

In accordance with an embodiment the present invention, the status of the problem solving work of a post-processing order may be set on the list screen and on the detail screen. For example, if the actual status indicates the post-processing order is new, it may be changed to indicate the post-processing order is in process and/or executed. Likewise, if the actual status of the post-processing order indicates it is in process, the status may be set to indicate it has been executed.

In accordance with embodiments the present invention, it is also possible to try a re-execution of the business process from the dialog transaction, if the status of the business process indicates it is still failed. If the execution of the business process is now successful, the status of the business process can be set to indicate it has been executed and the status of the problem solving work can be set to indicate it has been executed, since no more problem solving work is necessary.

In accordance with embodiments the present invention, navigation by a click to display and change transactions of the business objects that are relevant in the context of the post-processing order (e.g., business object and master business object of the post-processing order) and to display the transaction in the error log is possible from both list screen 900 and from detail screen 1000.

In accordance with some embodiments of the present invention, it is possible to archive post-processing orders that have the status set to indicate that the problem solving work has been executed.

In accordance with some embodiments of the present invention, post-processing orders may be enhanced by adding a "worklist" functionality. This means that a worklist field may be added to the header information of the post-processing order. The allowed entities for the worklist field may be defined during the customizing of the system. When creating a post-processing order, the worklist field may be filled and the value of the worklist field may be determined by a mapping of the business process and the most important error that caused the execution of the business process to fail to the worklist. The mapping may be done as part of the customizing of the system. Before the value of the worklist is stored in the post-processing order, the value may be overwritten by a customer specific program that may be activated when exiting the worklist. With a new transaction an assignment of users to worklists may be made, for example, a user may be assigned to many worklists, and many users may be assigned to the same worklist. When starting the dialog transaction for manual processing of post-processing orders, the selection screen may be displayed. Up to now the post-processing orders were selected using the selection criteria. Now, with the new functionality of worklists, the worklist may be used as an additional selection criteria, however, this field is, generally, not displayed on the selection screen. The values which are used for field worklist in the selection may be derived from the "user—worklist" assignment. This means that all worklist values may be used for the selection of post-processing orders, to which the user who starts the dialog transaction is assigned.

In accordance with some embodiments of the present invention, some business processes may be restarted with and/or without error correction, if an error occurred. These business processes may explicitly set the status of the problem solving work to indicate it has been executed (that is, no more problem solving actions are necessary) of a post-processing order, which was generated in the first attempted execution of the business process for this business object, if the restart leads to an execution of the business process without error. In this case, the status of the business process in this post-processing order may also set to indicate it has been executed. This functionality reduces the manual work with the dialog transaction, because the status of the manual work of some of the post-processing orders may now be set automatically to indicate that they were executed without manual interaction.

In accordance with some embodiments of the present invention, another automatic program, which looks at all of the post-processing orders having the status of the business process set to indicate it failed, may try to re-execute the business process again. When the program is started it may decide whether all of these post-processing orders are selected or whether only the post-processing orders with the status of the problem solving work set to indicate that it executed will be selected. In the second case, the probability may be higher that the selected post-processing orders are now executed, because the problems, which were responsible for the failure of the business process, were either manually or automatically solved. In some cases the source for the error, which was responsible for the failure of the execution of the business process, no longer exists so the business process may now be executed. If the business process runs without error, then this retry-program may update the post-processing order so that the status of the business process may be set to indicate it executed and the status of the manual work also may be set to indicate it executed because no more manual work is necessary.

In accordance with some embodiments of the present invention, it may also be possible that post-processing orders may be used after the successful execution of a business process, by defining a task that must still be performed after the business process was executed. For example, in this case, even though the business process control program may successfully execute a business process, it may create a post-processing order with "status of the problem solving work" is "new" and "status of the business process" is completed. The task, which may be done manually or automatically, can be described in the error messages, which are stored in the header and in the positions of the post-processing order.

Differences from the post-processing orders for "failed business processes" may include:
  When using post-processing orders for "failed business processes" the business process must be executed again after the problem solving work is done, in this alternative usage of the post-processing orders the business process will not be executed again after the problem solving work, because it is already executed.

When using post-processing orders for "failed business processes", the error messages which occurred while the business process failed are written into the post-processing order. In an alternative usage of post-processing orders, after the successful execution of a business process, messages may be written into the post-processing order describing what problem solving work must still be done. These messages can be created by the business process at the end of its successful execution or by the "business process control program".

An example for this type of use may occur in the banking world. For example, after execution of a business process named "account closure," which indicates an account was closed, of an important business partner, the bank may still want to make a telephone call to the business partner to inform him about other banking products.

In accordance with some embodiments of the present invention, When a failed business process is re-executed and the re-execution also fails, then the second failure may result in different error messages than the first try. If this is the case, the program that tried the execution may decide whether a new post-processing order is to be created for the second failure, or the new error messages are to be appended to the post-processing order, which was created after the first failure. Additionally, the existing post-processing order may also be kept as is without adding the new error messages. If a new post-processing order is created (first alternative in the section above), and then the new post-processing order may include a link to the first post-processing order, so that the system knows that these post-processing orders belong together.

In accordance with an embodiment of the present invention, a Core Banking ("Retail Banking") Post-processing Office system, which is a specific embodiment of the general Post-processing Office, may be used for performing the post-processing in a core banking environment. Specifically, the core banking post-processing office is a post-processing office for business processes in the context of retail banking. In retail banking applications there are many business processes, which normally run automatically. Most of them are started by the "end of day processing" application. This application starts all the batch jobs (i.e., programs running in the background), which run every night in a bank, for example, the execution of standing orders or the creation of bank statements. Each batch job may start many business processes (for example, the execution of standing orders for certain accounts), which should run in the night without interaction. The retail banking post-processing office may take care of those business processes, which should be executed automatically, especially but not exclusively at night, but encountered an error.

In accordance with the presently described retail banking embodiment, the business process control programs are programs that generally run at night as a batch job and belong to the "end of day processing" procedure of the bank. Examples of such business processes may include "execution of standing order" and "account closure." Examples of business objects may include "standing order" and "order for account closure." Examples of the master business objects may include "contracts" ("accounts" and "cards") or "business partner." Similarly, a post-processing order may include a date and a time when the business process was executed (and when the execution failed)—in the retail banking context this may be the "system date;" and a date and a time when the business process should have been executed—in the retail banking context this may be the "actual date of the bank posting area".

Figure 11:
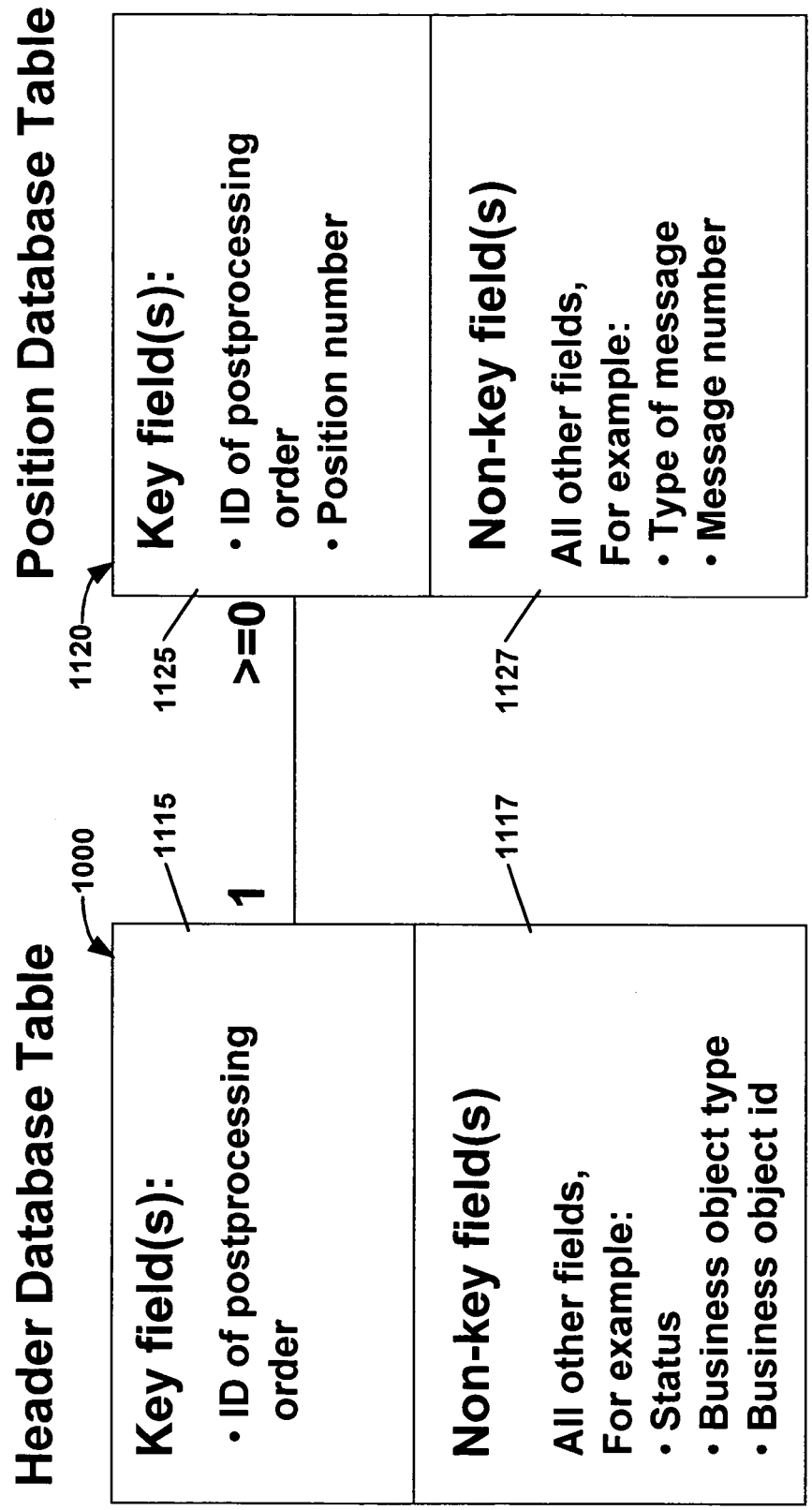
FIG. 11 is a top-level data representation of the post-processing order data structure, in accordance with an embodiment of the present invention.

FIG. 11 is a top-level data representation of the post-processing order data structure, in accordance with an embodiment of the present invention. In FIG. 11, a post-processing order may consist of a header table 1110 to store one record for each post-processing order that may be created and a position table 1120 to store zero, one or more position records associated with the one record for the post-processing order in header table 1110. Header table 1110 may include a key field 1115, which in the present embodiment may include an identification number of the post-processing order, and a plurality of non-key fields 1117. For example, a record in header table 1110 may include:

- An ID of the post-processing order (technical key, for example a GUID)
- A status of the problem solving work ("new", "in processing", "executed")
- A status of the business process ("failed", "executed")
- A business process which created the order, including:
  - A type of the business process
  - An ID of the instance of the execution of the business process
  - A date and time when the business process was executed (and the execution failed)
  - A date and time when the business process should have been executed
- A business object, which is most involved in the business process
  - A type of the business object
  - An ID of the business object
- A most important error, which occurred when the execution of the business process failed, and is, generally, determined by the system. Information provided with the error may include:
  - An error number
  - An error message type
- A worklist (Optional), which can have different values associated with each entry to indicate the party/parties responsible for correcting the error.
- Further information, which is used to manually process the post-processing order
  - A fixed number of, for example, 5 customer fields. These fields may be filled with customer-specific information which can be used for filtering the post-processing orders or as additional information, which is displayed when the order is manually processed
- A first master business object (optional), to which the business object described above has a strong relation and the first master business object is also useful for solving the problem (for example, displaying the object in the display transaction or for selecting post-processing orders)
  - A type of first master business object
  - An ID of first master business object
- A second master business object (optional), to which the business object described above has a strong relation and the second master business object is also useful for solving the problem (for example, displaying the object in the display transaction or for selecting post-processing orders)
  - A type of second master business object
  - An ID of second master business object
- Error log information
  - A type of the error log
  - An ID of the error log Information about the problem solving processing of the order
A note field
A process who/what executed the problem solving work (error correction) belonging to the order ("dialog transaction", "service report")
User who executed the problem solving work of the order
Date and time when the problem solving work belonging to the order was executed
Information about the execution of the business process belonging to the order
A process that executed the business process ("business process control program", "user with the dialog transaction"
The user
The date and time
These fields may be updated every time a user tries to execute the business process (in the cases when the execution failed and when it was successful)
Reference to another post-processing order (Optional)
It is possible that a post-processing order has a link to another post-processing order In FIG.11, position table 1120 may include one or more key fields 1125, which in the present embodiment may include the identification number of the post-processing order and a position number of the position record. In addition, position table 1120 may include a plurality of non-key fields 1127. For example, a record in position table 1120 may include:

An ID of the post-processing order
A position number, also a key field (for the different positions belonging to one order)
Message numbers
Message text
A kind of message (error, information, etc.)

In accordance with an embodiment of the present invention, header table 1110 and position table 1120 may be defined as:

Header table:
Key field: ORDER_ID

| Fieldname | Fieldtype | Data type | Length | Description |
| --- | --- | --- | --- | --- |
| ORDER_ID | /XXXXX/DTE_ORDER_ID | RAW | 16 | ID of the order |
| BUSINESS_PROCESS | /XXXXX/DTE_BUSINESS_PROCESS | CHAR | 10 | business process type |
| BUSINESS_PROC_ID | /XXXXX/DTE_BUSINESS_PROCESS_ID | CHAR | 20 | ID of business process |
| MAIN_OBJTYPE | /XXXXX/DTE_MAIN_OBJTYPE | CHAR | 10 | most important business Object - Type |
| MAIN_OBJKEY | /XXXXX/DTE_MAIN_OBJKEY | CHAR | 70 | most important business Object - ID |
| BASIC_OBJTYPE | /XXXXX/DTE_BASIC_OBJTYPE | CHAR | 10 | master business object - type |
| BASIC_OBJKEY | /XXXXX/DTE_BASIC_OBJKEY | CHAR | 70 | master business object - ID |
| ENV_OBJTYPE | /XXXXX/DTE_ENV_OBJTYPE | CHAR | 10 | another master business object - type |
| ENV_OBJKEY | /XXXXX/DTE_ENV_OBJKEY | CHAR | 70 | another master business object - ID |
| MSGID | SYMSGID | CHAR | 20 | Message class (of most important Error message) |
| MSGTY | SYMSGTY | CHAR | 1 | Message type |
| MSGNO | SYMSGNO | NUMC | 3 | Message number |
| MSGV1 | SYMSGV | CHAR | 50 | Message variable number 1 |
| MSGV2 | SYMSGV | CHAR | 50 | Message variable number 2 |
| MSGV3 | SYMSGV | CHAR | 50 | Message variable number 3 |
| MSGV4 | SYMSGV | CHAR | 50 | Message variable number 4 |
| LOG_CAT | /XXXXX/DTE_LOG_CAT | CHAR | 1 | Type of error log |
| LOG_NO | /XXXXX/DTE_LOG_NO | CHAR | 20 | ID of error log |
| STATUS | /XXXXX/STATUS | CHAR | 1 | Status of error correction work |
| BP_STATUS | /XXXXX/BP_STATUS | CHAR | 1 | Status of business process |
| TEXT | /XXXXX/DTE_TEXT | CHAR | 50 | Note |
| PROCESSOR | /XXXXX/DTE_PROCESSOR | CHAR | 12 | User who took order "in process" |
| POSTDATE | /XXXXX/DTE_POSTDATE | DATS | 8 | Date when business process should Have been executed |
| CREATIONDATE | /XXXXX/DTE_CREATIONDATE | DATS | 8 | Date when business process Execution was tried, Date when the Order was created |
| PRIORITY | /XXXXX/DTE_PRIORITY | NUMC | 1 | Priority of the order (the priority is Set when the order is created in a "customer exit (program)". The field can be used as selection criteria |
| WORKLIST | /XXXXX/DTE_WORKLIST | CHAR | 4 | WORKLIST |
| FA_AMNT | /XXXXX/DTE_FA_AMNT | CURR | 23 decimal 2 | Customer Field for "amounts" |
| FA_CURR | /XXXXX/DTE_FA_CURR | CUKY | 5 | customer field for "Currency" (for The amount field) |
| FA1 | /XXXXX/DTE_FA1 | CHAR | 40 | customer field for "40 characters" |
| FA2 | /XXXXX/DTE_FA2 | CHAR | 40 | customer field for "40 characters" |
| FA3 | /XXXXX/DTE_FA3 | CHAR | 40 | customer field for "40 characters" |
| FA4 | /XXXXX/DTE_FA4 | CHAR | 40 | customer field for "40 characters" |
| FA5 | /XXXXX/DTE_FA5 | CHAR | 40 | customer field for "40 characters" |
| FA6 | /XXXXX/DTE_FA6 | CHAR | 40 | customer field for "40 characters" |

-continued

Header table:
Key field: ORDER_ID

| Fieldname | Fieldtype | Data type | Length | Description |
|---|---|---|---|---|
| USER_CREATE | /XXXXX/DTE_USER_CREATE | CHAR | 12 | User who created the order |
| TIMESTAMP_CREATE | /XXXXX/DTE_TIMESTAMP_CREATE | DEC | 21 decimal 7 | Timestamp when the order was created |
| USER_CHANGE | /XXXXX/DTE_USER_CHANGE | CHAR | 12 | User who made the last change in the order |
| TIMESTAMP_CHANGE | /XXXXX/DTE_TIMESTAMP_CHANGE | DEC | 21 decimal 7 | Timestamp when the last change in the order was made |
| REF_ORDER_ID | /XXXXX/DTE_REF_ORDER_ID | RAW | 16 | ID of order to which this Order is linked |

Remarks:
A message may be represented in the system by a Message Class, the message number (within the given message class) and up to 4 actual variable values for the maximum 4 variables used in the messages Position table:
Key fields: ORDER_ID, POSNR

| Fieldname | Fieldtype | Data type | Length | Description |
|---|---|---|---|---|
| ORDER_ID | /XXXXX/DTE_ORDER_ID | RAW | 16 | ID of the order |
| POSNR | /XXXXX/DTE_POSNR | NUMC | 6 | Position number |
| MSGID | SYMSGID | CHAR | 20 | Message class (of error msg) |
| MSGTY | SYMSGTY | CHAR | 1 | Message type |
| MSGNO | SYMSGNO | NUMC | 3 | Message number |
| MSGV1 | SYMSGV | CHAR | 50 | Message variable number 1 |
| MSGV2 | SYMSGV | CHAR | 50 | Message variable number 2 |
| MSGV3 | SYMSGV | CHAR | 50 | Message variable number 3 |
| MSGV4 | SYMSGV | CHAR | 50 | Message variable number 4 |

Several embodiments of the present invention are specifically illustrated and described herein. However, it will be appreciated that modifications and variations of the present invention are covered by the above teachings and come within the purview of the appended claims without departing from the spirit and intended scope of the invention.

What is claimed is:

1. In an enterprise system, a method of post-processing to correct errors resulting from executing a business process, the method comprising:
executing a plurality of business processes, each business process operating on at least one business object;
if a failure is detected during the execution of a business process of the plurality of business processes:
identifying the at least one business object affected by the failure of the business process, including a master business object most closely related to the business process;
identifying each error associated with the business process failure;
creating a post-processing order for the failed business process, the post-processing order:
identifying the failed business process;
storing links to the at least one business object affected by the business process failure; and
storing the each error associated with the business process failure;
correcting the each error identified in the post-processing order, said correcting comprising:
locking the post-processing order to prevent concurrent access to the post-processing order during said correcting;
accessing a business object that is identified by an error of the each error using a corresponding stored business object link;
changing an aspect of the business object causing the error; and
repeating said accessing and said changing for each business object referenced in the each error;
re-executing the business process;
determining whether re-executing the business process was successful; and
setting a status of the post-processing order related to the failed business process to indicate completion and setting a status related to correcting the each error, if re-executing the business process was successful.

2. The method of claim 1, wherein executing a business process comprises:
executing the business process in a batch-processing mode.

3. The method of claim 2, wherein executing a business process further comprises:
executing the business process without user interaction during the execution.

4. The method of claim 1, wherein obtaining information related to the failure of the business process comprises:
obtaining information including
an identification of the post-processing order,
a status of the error correction work,
a status of the business process,
an identification of the source business process,
a business object that is involved in executing the business process,
an error responsible for the failure of the business process, one or more implementation-specific fields,
a master business object that controls the business object,
information on the error log,
information on the correcting of the errors in the post-processing order, and
information on the execution of the business process.

5. The method of claim 1, wherein creating a post-processing order using the at least one business object and the each error comprises:
creating the post-processing order to include a header using the at least one business object and the each error.

6. The method of claim 5, wherein creating a post-processing order using the at least one business object and the each error further comprises:
creating the post-processing order to further include at least one post-processing order position using one or more other errors.

7. The method of claim 1, wherein correcting the each error identified in the post-processing order comprises:
correcting an error responsible for failure of the business process in the post-processing order.

8. The method of claim 7, wherein correcting the each error identified in the post-processing order further comprises:
correcting at least one other error identified in the post-processing order, if there is more than one error identified in the post-processing order.

9. The method of claim 1, wherein executing the corrected business process comprises:
immediately executing the corrected business process.

10. The method of claim 1, wherein executing the corrected business process comprises:
scheduling the execution of the corrected business process for a specified time.

11. The method of claim 1, further comprising:
determining whether to create a new post-processing order or append new errors to the post-processing order, if re-executing the business process failed;
closing the post-processing order related to the failed business process, if it was determined to create the new post-processing order; and
creating the new post-processing order using information related to the failed re-executed business process, one or more post-processing positions and one or more errors related to the failed re-executed business process.

12. The method of claim 11, further comprising:
creating the new post-processing order with a link to the closed post-processing order.

13. The method of claim 1, further comprising:
determining whether to create a new post-processing order or append new errors to the post-processing order, if re-executing the business process failed;
appending error information to the post-processing order related to the failed business process, if it was determined to append the errors to the post-processing order; and
creating the new post-processing order using information related to the failed re-executed business process, one or more post-processing positions and one or more errors related to the failed re-executed business process.

14. The method of claim 1,
wherein said creating the post-processing order using the at least one business object and the each error comprises recording the post-processing order on the computer-readable medium.

15. In an enterprise system, a method comprising:
executing a business process, the business process operating on at least one business object;
determining if a failure occurred during the execution of the business process;
if the failure did not occur during the execution of the business process,
creating a first post-processing order upon successful execution of the business process, the first post-processing order identifying a task to perform that is dependent on the successful execution of the business process;
setting a status of the first post-processing order related to the business process to indicate completion and setting a status related to the dependent task; and
if a failure occurred during the execution of the business process:
identifying the at least one business object affected by the failure of the business process, including a master business object most closely related to the business process;
identifying each error associated with the business process failure;
creating a second post-processing order for the failed business process, the second post-processing order:
identifying the failed business process;
storing links to the at least one business object affected by the business process failure; and
storing the each error associated with the business process failure;
correcting the each error identified in the second post-processing order, said correcting comprising:
locking the second post-processing order to prevent concurrent access to the second post-processing order during said correcting;
accessing a business object that is identified by an error of the each error using a corresponding stored business object link;
changing an aspect of the business object causing the error; and
repeating said accessing and said changing for each business object referenced in the each error;
re-executing the failed business process;
determining whether the re-executing of the failed business process was successful;
setting a status of the second post-processing order related to the business process to indicate completion, if the re-executing of the failed business process was successful; and
setting a status of error correction work to indicate completion, if one of the re-executing the failed business process was successful.

16. The method of claim 15, wherein creating a second post-processing order comprises:
creating the second post-processing order to include:
a header having the information related to the failed business process and an error responsible for the failure identified during the execution of the business process, and zero or more post-processing order positions having information about all of the other errors.

17. The method of claim 15, wherein creating the second post-processing order to include a header having the information related to the failed business process comprises:
creating the header to include:
an identification of the second post-processing order,
a status of the error correction work,
a status of the business process, an identification of the source business process,
a business object that executes the business process,
an error responsible for the failure,
one or more implementation-specific fields,
at least one master business object, which controls the business object,
information on the error log,
information on the correcting of the errors in the post-processing order, and
information on the execution of the business process.

18. The method of claim 17, wherein creating the header further comprises:
creating the header to include a worklist.

19. The method of claim 17, wherein creating the header further comprises:
creating the header to include a reference to a related post-processing order.

20. The method of claim 15, wherein said creating the first post-processing order upon successful execution of the business process comprises recording the first post-processing order on a computer-readable medium; and
wherein said creating the second post-processing order using the at least one business object and the each error comprises recording the second post-processing order on the computer-readable medium.

21. A method of post-processing to correct errors resulting from executing a business process, the method comprising:
executing, by a business process control program, a business process, the business process operating on at least one business object;
determining whether a failure occurred during the execution of the business process;
if the failure occurred during the execution of the business process,
identifying the at least one business object affected by the failure of the business process, including a master business object most closely related to the business process;
identifying each error associated with the business process failure;
creating a post-processing order for the failed business process, the post-processing order:
identifying the failed business process;
storing links to the at least one business object affected by the business process failure; and
storing the each error associated with the business process failure;
determining whether to re-execute the business process without error correction, if the execution of the business process failed;
correcting the at least one error in the second post-processing order, if the execution of the business process failed and the business process was not re-executed, said correcting comprising:
locking the post-processing order to prevent concurrent access to the post-processing order during said correcting;
accessing a business object that is identified by an error of the each error using a corresponding stored business object link;
changing an aspect of the business object causing the error; and
repeating said accessing and said changing for each business object referenced in the each error;
re-executing the business process, if the each error in the post-processing order was corrected;
determining whether one of the re-executions of the business process was successful;
setting a status of the second post-processing order related to the business process to indicate completion; and
setting a status of error correction work to indicate completion.

22. The method of claim 21, wherein said executing a business process comprises:
executing the business process with a plurality of other business processes in a batch-processing mode.

23. The method of claim 21, wherein said executing a business process comprises:
executing the business process using a control program.

24. The method of claim 21, wherein said determining whether a failure occurred during the execution of the business process comprises:
determining whether one or more errors occurred during the execution of the business process.

25. The method of claim 21, further comprising:
determining an error responsible for the failure of the business process from one or more errors that occurred during the execution of the business process.

26. The method of claim 25, further comprising:
determining at least one master business object to which the at east one business object is strongly related.

27. The method of claim 26, further comprising:
obtaining information on manually processing the post-processing order.

28. The method of claim 21, wherein said creating the post-processing order comprises:
creating the post-processing order to include the at least one business object, the each error, and position information.

29. The method of claim 28, wherein said position information comprises:
a technical key for the post-processing order;
a position number;
one or more message numbers;
a message text for each one or more message numbers; and
a kind of message for each one or more message numbers.

30. The method of claim 21, wherein said determining whether to re-execute the business process without error correction comprises:
determining whether a predetermined period of time has elapsed since the execution of the business process failed.

31. The method of claim 21, wherein said determining whether to re-execute the business process without error correction comprises:
determining whether an instruction to re-execute the business process has been received.

32. The method of claim 21,
wherein said creating the post-processing order to include the at least one business object and the each error identified during the execution of the business process, if the execution of the business process failed, comprises recording the post-processing order on the computer-readable medium.

* * * * *